US010805689B2

(12) United States Patent
Jung et al.

(10) Patent No.: US 10,805,689 B2
(45) Date of Patent: Oct. 13, 2020

(54) METHOD OF TRANSMITTING IP-BASED BROADCASTING DATA OVER CABLE BROADCASTING NETWORK AND APPARATUS FOR SAME

(71) Applicant: Electronics and Telecommunications Research Institute, Daejeon (KR)

(72) Inventors: Joon Young Jung, Daejeon (KR); Soon Choul Kim, Daejeon (KR); Heung Mook Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 22 days.

(21) Appl. No.: 16/135,373

(22) Filed: Sep. 19, 2018

(65) Prior Publication Data
US 2019/0090029 A1    Mar. 21, 2019

(30) Foreign Application Priority Data
Sep. 19, 2017    (KR) .......................... 10-2017-0120672

(51) Int. Cl.
| H04N 7/173 | (2011.01) |
| H04N 21/643 | (2011.01) |
| H04N 21/2381 | (2011.01) |
| H04L 27/00 | (2006.01) |
| H04N 21/434 | (2011.01) |
| H04N 21/2383 | (2011.01) |
| H04L 1/00 | (2006.01) |

(52) U.S. Cl.
CPC ... *H04N 21/64322* (2013.01); *H04L 27/0008* (2013.01); *H04N 21/2381* (2013.01); *H04N 21/2383* (2013.01); *H04N 21/4345* (2013.01); *H04L 1/0003* (2013.01)

(58) Field of Classification Search
CPC ......... H04N 21/64322; H04N 21/2381; H04N 21/2383; H04N 21/4345; H04L 27/0008; H04L 1/0003
See application file for complete search history.

(56) References Cited

U.S. PATENT DOCUMENTS

| 6,928,656 B1 | 8/2005 | Addington | |
| 9,667,757 B2* | 5/2017 | Yang | ....................... H04L 69/22 |
| 2011/0051753 A1* | 3/2011 | Chapman | ........... H04N 21/2381 370/503 |
| 2012/0167153 A1 | 6/2012 | Ryu et al. | |
| 2012/0327955 A1* | 12/2012 | Herrmann | ............ H04N 21/235 370/476 |

(Continued)

FOREIGN PATENT DOCUMENTS

KR    10-2016-0101001 A    8/2016

*Primary Examiner* — Kyu Chae
(74) *Attorney, Agent, or Firm* — NSIP Law

(57) ABSTRACT

Disclosed is a method of transmitting broadcasting data and apparatus for the same. According to an embodiment of the present disclosure, the method of transmitting broadcasting data includes: determining at least one IP-based data packet provided in different lengths received from a higher layer; generating a media transport packet having a fixed length by converting the at least one IP-based data packet; and generating broadcasting data by modulating the generated media transport packet on the basis of a broadcasting data modulation scheme and transmitting the broadcasting data.

16 Claims, 12 Drawing Sheets

(56) References Cited

U.S. PATENT DOCUMENTS

| | | | |
|---|---|---|---|
| 2013/0094563 A1 | 4/2013 | Bae | |
| 2015/0264447 A1* | 9/2015 | Brooks | H04N 21/2221 |
| | | | 725/31 |
| 2016/0165017 A1* | 6/2016 | Kwon | H04L 69/22 |
| | | | 370/476 |
| 2016/0366368 A1 | 12/2016 | Kwon | |
| 2018/0139033 A1* | 5/2018 | Okada | H04N 21/438 |
| 2018/0367502 A1* | 12/2018 | Kwon | H04L 69/22 |

* cited by examiner

FIG. 6

| Field name | Length | Value |
|---|---|---|
| sync_byte | 8 bits | 0×47:MPEG Packet sync byte |
| transport_error_indicator | 1 bit | Whether there is error in receiving packet is indicated |
| payload_unit_start_indicator | 1 bit | Whether there is new IP packet data start in TS packet payload is indicated |
| transport_priority | 1 bit | Not used. Set to '0 |
| PID | 13 bits | Identifier for identify packet |
| transport_scrambling_control | 2 bits | Not used. Set to '00 |
| adaptation_field_control | 2 bits | Not used. Set to '01' |
| continuity_counter | 4 bits | Cyclic counter that increases by 1 for TS packets having same PID |

METHOD OF TRANSMITTING IP-BASED BROADCASTING DATA OVER CABLE BROADCASTING NETWORK AND APPARATUS FOR SAME

CROSS REFERENCE TO RELATED APPLICATION

The present application claims priority to Korean Patent Application No. 10-2017-0120672, filed Sep. 19, 2017, the entire contents of which is incorporated herein for all purposes by this reference.

BACKGROUND OF THE INVENTION

Field of the Invention

The present disclosure relates generally to technology of transmitting broadcasting data. More particularly, the present disclosure relates to a method of constructing a media data packet and an apparatus for the same.

Description of the Related Art

A cable TV broadcasting network provides a general broadcasting service and a communication service via a cable modem using media characteristics in which bidirectional communication is possible.

A digital broadcasting service and a communication service used in the cable TV broadcasting network use the same physical layer transmission standard. The physical layer standards for transmission in the cable TV broadcasting service is a 64-quadrature amplitude modulation (QAM) or 256-QAM scheme, and the transport layer standards for the broadcasting service are based on an MPEG-2 system. Therefore, as an input formation for modulation, an MPEG-2 transport stream (TS) defined in the MPEG-2 system is used.

Generally, MPEG-2 TS is a transmission format defined in the MPEG-2 system standards for transmitting digital broadcasting data, and is commonly used in most digital broadcasting systems.

Further, as image-processing technology and communication processing technology develop, the image quality level expected by a user increases.

The foregoing is intended merely to aid in the understanding of the background of the present disclosure, and is not intended to mean that the present disclosure falls within the purview of the related art that is already known to those skilled in the art.

SUMMARY OF THE INVENTION

In the case of a UHD broadcasting service, a multi-carrier modulation scheme in orthogonal frequency-division multiplexing (OFDM) is used in the physical layer, and also, IP-based MMT and DASH-ROUTE are used in the transport layer.

The physical layer and the transport layer required in the UHD broadcasting service are different from the physical layer and the transport layer used in an existing cable TV broadcasting network, and thus it is difficult to transmit UHD broadcasting data.

Accordingly, the present disclosure has been made keeping in mind the above problems occurring in the related art, and the present disclosure is intended to propose a method and apparatus that are capable of transmitting UHD broadcasting data using an existing cable TV broadcasting system, which remains.

Also, the present disclosure is intended to propose a method and apparatus that are capable of transmitting IP-based broadcasting data without a change in a system in the physical layer.

It is to be understood that the technical problems to be solved by the present disclosure are not limited to the aforementioned technical problems, and other technical problems which are not mentioned herein will be apparent from the following description to a person of ordinary skill in the art to which the present disclosure pertains.

In order to achieve the above object, according to one aspect of the present disclosure, there is provided a method of transmitting broadcasting data, the method including: determining at least one IP-based data packet provided in different lengths received from a higher layer; generating a media transport packet having a fixed length by converting the at least one IP-based data packet; and generating broadcasting data by modulating the generated media transport packet on the basis of a broadcasting data modulation scheme and transmitting the broadcasting data.

According to another aspect of the present disclosure, there is provided an apparatus for transmitting broadcasting data, the apparatus including: a media transport packet generation unit receiving at least one IP-based data packet provided in different lengths from a higher layer and generating a media transport packet having a fixed length by converting the at least one IP-based data packet; and a broadcasting data transmission unit generating broadcasting data by modulating the generated media transport packet on the basis of a broadcasting data modulation scheme and transmitting the generated broadcasting data.

It is to be understood that the foregoing summarized features are exemplary aspects of the following detailed description of the present disclosure without limiting the scope of the present disclosure.

According to the present disclosure, the method and apparatus capable of transmitting UHD broadcasting data using an existing cable TV broadcasting system are provided.

Also, according to the present disclosure, the method and apparatus capable of transmitting IP-based broadcasting data using the existing cable TV broadcasting system without a change in a system in the physical layer are provided.

Also, according to the present disclosure, switching to a next-generation IP-based service is easy even without building an additional transmission system for cable TV broadcasting.

The effects that may be obtained from the present disclosure will not be limited only to the above-described effects. In addition, other effects which are not described herein will become apparent to those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which:

FIG. 6 is a diagram illustrating an example of information contained in a header of a media transport packet constructed by the apparatus for transmitting the broadcasting data shown in FIG. 5;

DETAILED DESCRIPTION OF THE INVENTION

Figure 1:
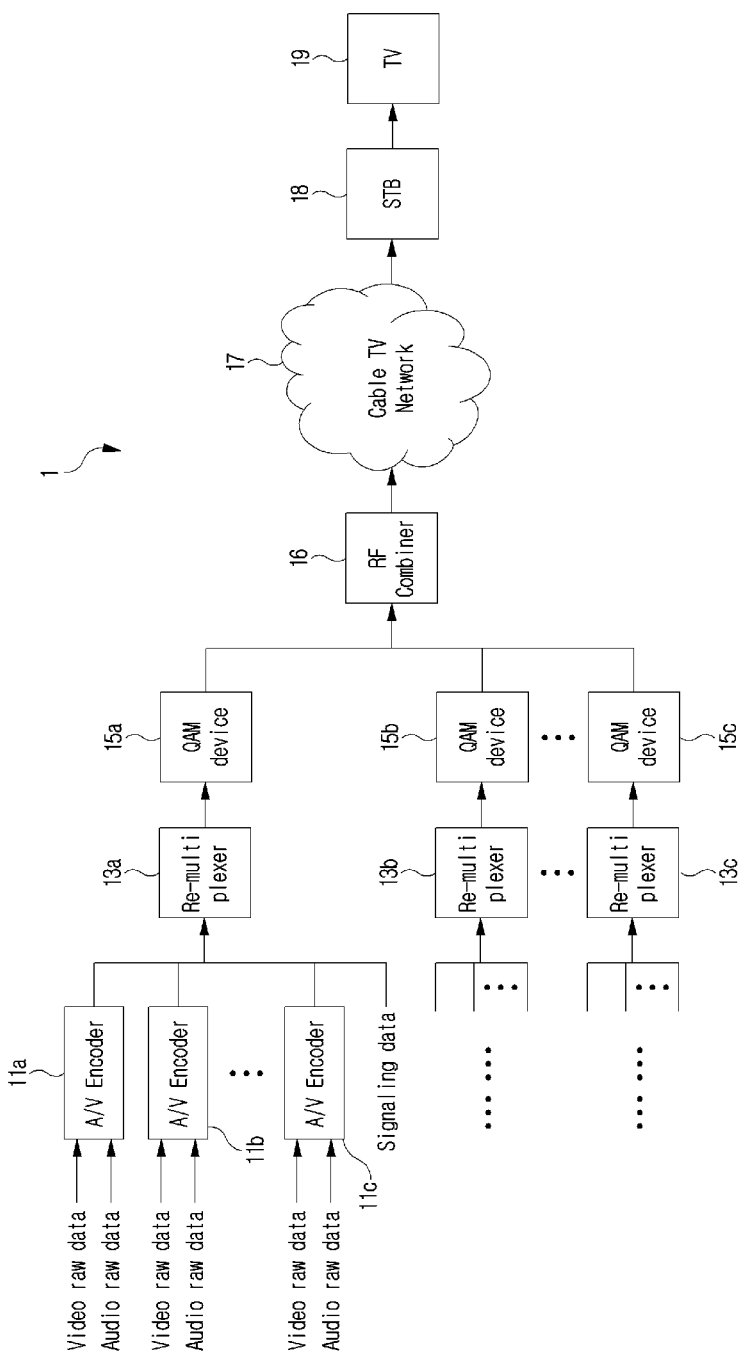
FIG. 1 is a diagram illustrating an example of a configuration of a conventional cable TV broadcasting system.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinbelow, exemplary embodiments of the present disclosure will be described in detail with reference to the accompanying drawings.

FIG. 1 is a diagram illustrating an example of a configuration of a conventional cable TV broadcasting system.

In the conventional cable TV broadcasting system 1, video data and audio data, which make up a broadcasting program, are input to AN encoders 11a, 11b, and 11c, and the AN encoders 11a, 11b, and 11c that perform encoding on the video data and the audio data such that MPEG-2 transport streams (TSs) are output. Here, MPEG-2 TS may be composed of single program transport streams (SPTS).

In the meantime, re-multiplexers 13a, 13b, and 13c receive multiple MPEG-2 TSs, for example, multiple SPTSs, perform multiplexing thereon, and output the resulting MPEG-2 TSs. Each of the resulting MPEG-2 TSs output from the re-multiplexers 13a, 13b, and 13c contains multiple programs, and may be a multiple program transport stream (MPTS). The MPTSs are modulated by respective QAM devices 15a, 15b, and 15c, and are output as an RF signal. The output RF signal may be set to a bandwidth of 6 or 8 MHz, physically, and the RF signal is transmitted to a subscriber set-top box (STB) 18 through an RF combiner 16 via a cable TV broadcasting network 17. The subscriber STB 18 receives the RF signal by tuning to the relevant frequency band, and performs demodulation thereon, and then decodes the AN signals, whereby video and audio signals are reconstructed. Theses reconstructed video and audio signals are output through a playback device such as a TV or the like.

Figure 2:
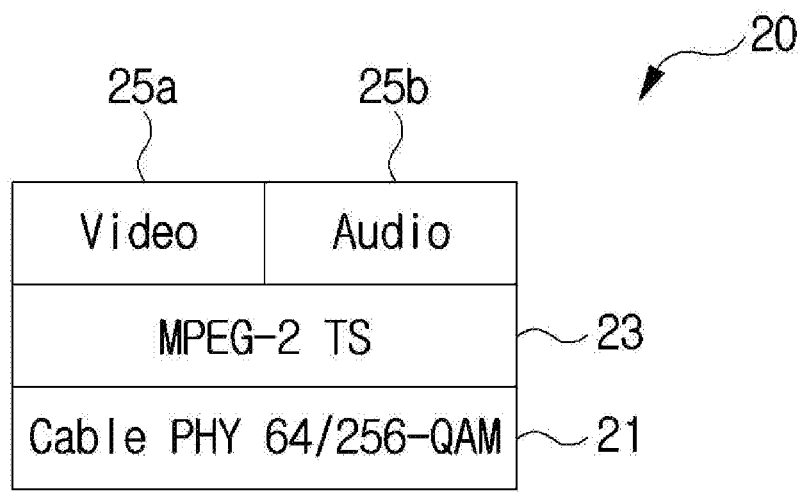
FIG. 2 is a diagram illustrating an example of a broadcasting service protocol stack applied in the conventional cable TV broadcasting system.

FIG. 2 is a diagram illustrating an example of a broadcasting service protocol stack applied in the conventional cable TV broadcasting system.

The broadcasting service protocol stack 20 applied in the conventional cable TV broadcasting system may include: a physical layer 21 for QAM; a system layer 23 constructing a broadcasting transport packet (for example, MPEG-2 TS) for broadcasting media transport; and service layers 25a and 25b providing the video data and the audio data that make up the broadcasting program.

As described above, in the broadcasting service protocol stack 20 applied to the conventional cable TV broadcasting system, the system layer 23 and the service layers 25a and 25b are configured based on the MPEG-2 system, and thus it is impossible to provide an IP-based broadcasting service in terms of structure. Therefore, in order to provide the IP-based broadcasting service, modification of the broadcasting service protocol stack according to standards (for example, ATSC 3.0 standards) is required. However, when the broadcasting service protocol stack is modified according to the standards (for example, ATSC 3.0 standards), it is necessary to change all transmission devices in which an investment has been made for the existing digital broadcasting service.

In the cable TV broadcasting system according to various embodiments of the present disclosure, while the physical layer of the broadcasting service protocol stack applied in the conventional cable TV broadcasting system remains, an IP-based broadcasting data transport protocol is used at the higher layer.

Figure 3:
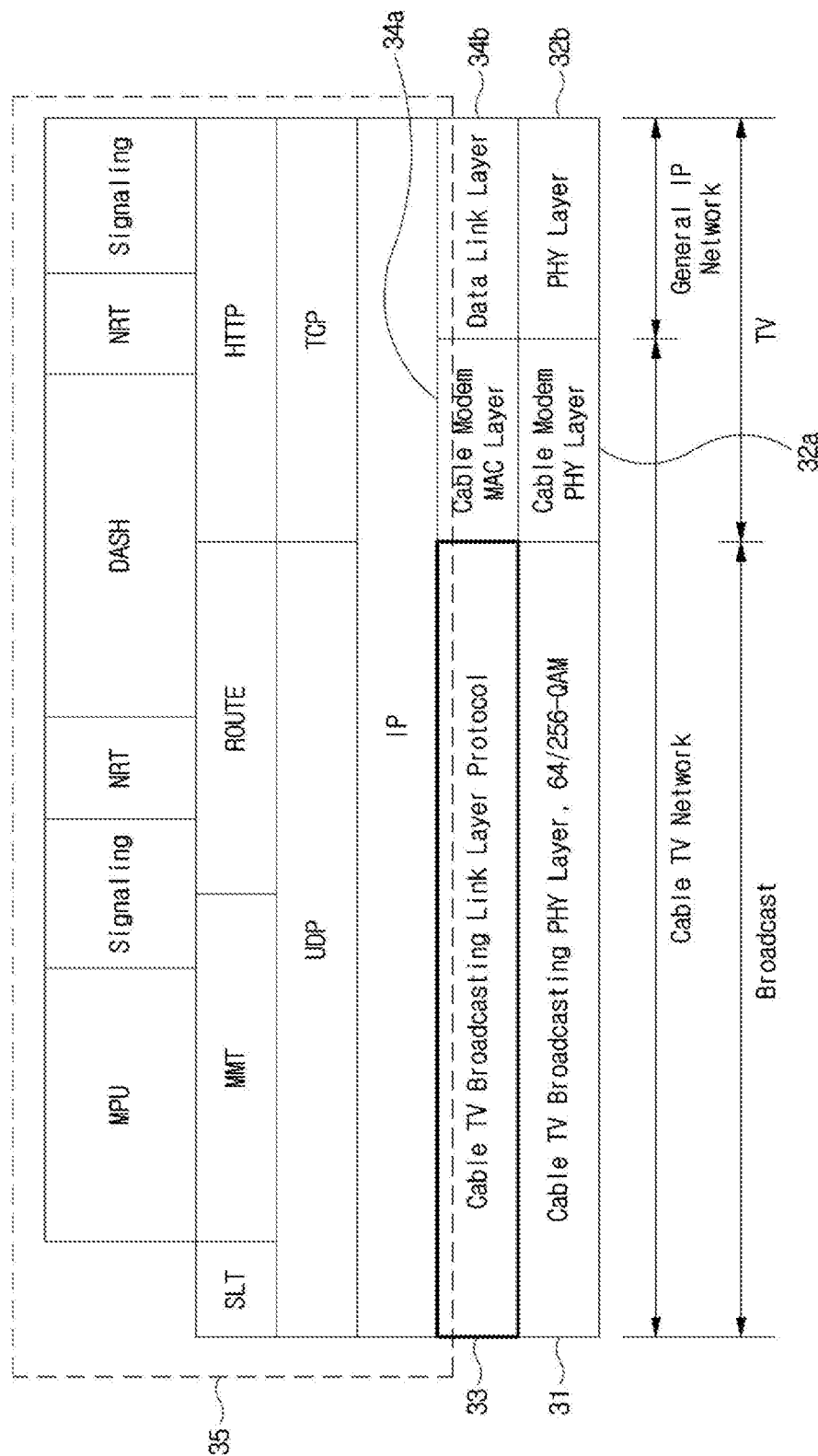
FIG. 3 is a diagram illustrating an example of a broadcasting service protocol stack applied in a cable TV broadcasting system according to various embodiments of the present disclosure.

FIG. 3 is a diagram illustrating an example of a broadcasting service protocol stack applied in a cable TV broadcasting system according to various embodiments of the present disclosure.

Referring to FIG. 3, a broadcasting service protocol stack 30 applied in the cable TV broadcasting system according to the present disclosure may include: a cable TV broadcasting physical layer 31; a cable TV broadcasting link layer 33; and an IP-based broadcasting service layer 35.

At the cable TV broadcasting physical layer 31, data modulation may be performed on the basis of a compatible scheme (for example, the 64/256-QAM scheme) in the existing broadcasting communication network.

At the cable TV broadcasting link layer (CLP) 33, in order to transmit an IP-based data packet, provided at the IP-based broadcasting service layer 35, which is a higher layer, using the existing broadcasting communication network, the IP-based data packet may be converted into a transport packet.

The IP-based broadcasting service layer 35 includes a protocol for providing communication network (broadband) and integrated broadcast broadband (IBB) services. For example, a protocol for providing communication network (broadband) and integrated broadcast broadband (IBB) services used at the IP-based broadcasting service layer 35 may be a terrestrial ATSC 3.0 protocol.

The cable TV broadcasting network is capable of simultaneously providing communication services using the cable modem within the same network, and thus the IBB service is provided without an additional communication network. That is, the IBB service is easily provided using a cable modem media access control (MAC) layer 34a and a cable modem physical (PHY) layer 32a. To a subscriber who does not use a cable modem service, the IBB service is provided using a data link layer 34b and a physical layer 32b that are supported in another IP network (a communication carrier network).

At the IP-based broadcasting service layer 35, an IP-based data packet is generated and is provided, and such generation and provision of the IP-based data packet are based on the ATSC 3.0 protocol.

An input data format of the 64/256-QAM scheme used at the cable TV broadcasting physical layer 31 may be an MPEG-2 TS. Therefore, in order to transmit the IP-based data packet, conversion to MPEG-2 TS is necessary. Considering this, at the cable TV broadcasting link layer 33, the IP-based data packet, provided at the IP-based broadcasting service layer 35, which is the higher layer, may be converted into the media transport packet.

Figure 4:
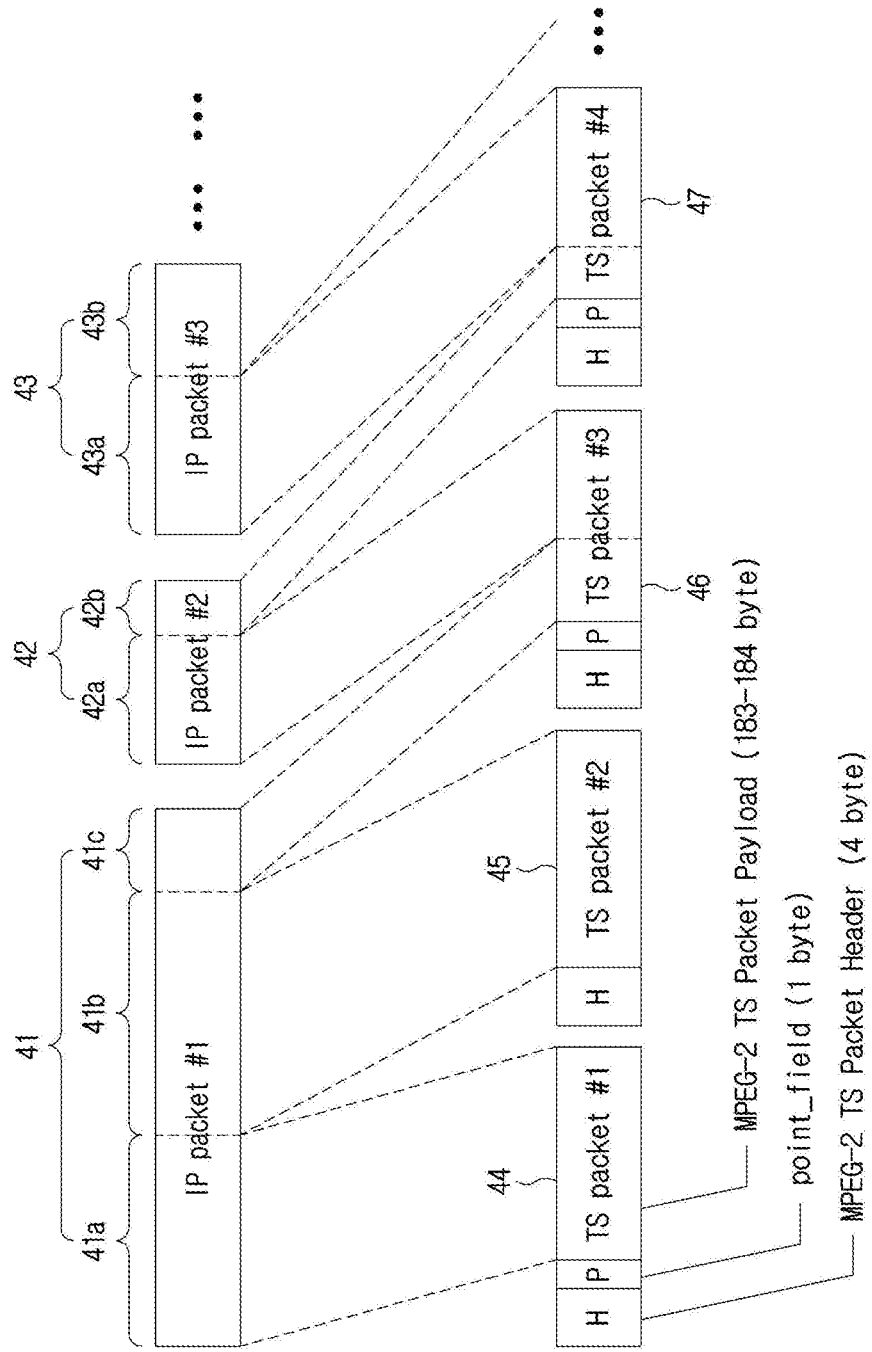
FIG. 4 is a diagram illustrating an example of a relation between an IP-based data packet and a media transport packet used in a cable TV broadcasting system according to various embodiments of the present disclosure.
Figure 5:
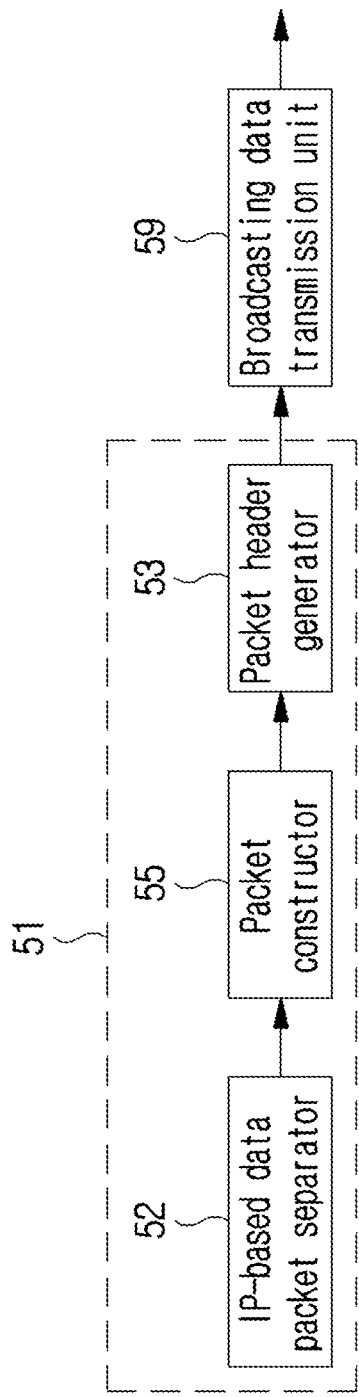
FIG. 5 is a diagram illustrating an example of a configuration of an apparatus for transmitting broadcasting data, which is provided in a cable TV broadcasting system according to various embodiments of the present disclosure.

FIG. 4 is a diagram illustrating an example of a relation between an IP-based data packet and a media transport packet used in a cable TV broadcasting system according to various embodiments of the present disclosure. FIG. 5 is a diagram illustrating an example of a configuration of an apparatus for transmitting broadcasting data, which is provided in a cable TV broadcasting system according to various embodiments of the present disclosure.

First, referring to FIG. 4, IP-based data packets 41, 42, and 43 are provided in different lengths, but media transport packets 44, 45, 46, and 47 provided at the cable TV broadcasting link layer 33 may be packets fixed in a predetermined length.

In the meantime, referring to FIG. 5, according to various embodiments of the present disclosure, an apparatus 50 for transmitting broadcasting data may include a media transport packet generation unit 51 and a broadcasting data transmission unit 59. The media transport packet generation unit 51 may process an operation performed at the cable TV broadcasting link layer 33, and the broadcasting data transmission unit 59 may process an operation performed at the cable TV broadcasting physical layer 31.

Specifically, the media transport packet generation unit 51 may include an IP-based data packet separator 52, a packet header generator 53, and a packet constructor 55.

The IP-based data packet separator 52 separates the IP-based data packets 41, 42, and 43 in different lengths according to the length of the data payload of the media transport packet, and provides the resulting IP-based data packets 41a, 41b, 41c, 42a, 42b, 43a, and 43b to the packet constructor 55.

The packet constructor 55 sequentially allocates the resulting IP-based data packets 41a, 41b, 41c, 42a, 42b, 43a, and 43b to the media transport packets 44, 45, 46, and 47, generates configuration information for the media transport packets 44, 45, 46, and 47, and combines header information of the media transport packets generated by the packet header generator 53 thereto, thereby generating the resulting media transport packets 44, 45, 46, 47.

For example, the media transport packet may be composed of 188 bytes, which are the media data transport packet header of 4 bytes and the data payload of 184 bytes. However, in some cases, the first byte of the payload of 184 bytes may be used as a pointer field. That is, when there is a start of a new IP-based data packet within the payload of the relevant media transport packet, the packet constructor 55 generates a pointer field of 1 byte to indicate the byte number at which the new IP-based data packet starts within the payload of the media transport packet. The pointer field may be positioned after the header of the media transport packet.

When the pointer field is inserted, the packet constructor 55 may provide information on insertion of the pointer field to the packet header generator 53. Further, the packet header generator 53 may set the relevant information in the Payload_Unit_Start_Indicator (PUSI) field included in the header of the media transport packet. For example, the packet header generator 53 may set the value of the PUSI field to "1" when receiving information indicating that the pointer field is present from the packet constructor 55, and may set the value of the PUSI field to "0" when not receiving information indicating that the pointer field is present.

Also, the packet header generator 53 may check information on an MPEG packet sync byte, information on whether an error is present in receiving the packet, an identifier for identifying the packet, a counter value for the media transport packet having the same PID, and the like, and may include information thereon in the header of the media transport packet (referring to FIG. 6).

In the meantime, FIGS. 7A to 7D are diagrams illustrating examples of media transport packets generated by an apparatus for transmitting the broadcasting data according to various embodiments of the present disclosure.

Figure 7A:
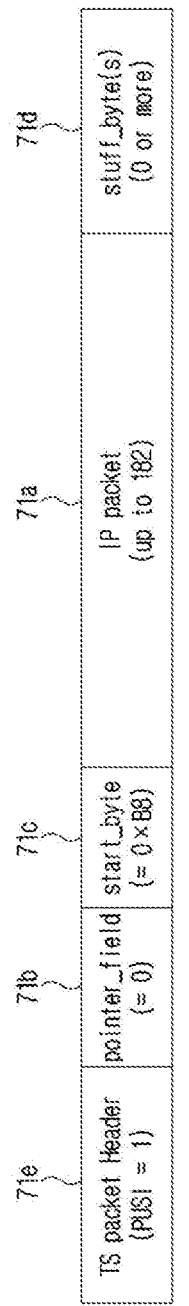
FIGS. 7A to 7D are diagrams illustrating examples of media transport packets generated by an apparatus for transmitting the broadcasting data according to various embodiments of the present disclosure.

FIG. 7A shows the case in which an IP-based data packet 71a starts after a pointer field 71b of a media data transport packet.

Since a start byte of the IP-based data packet 71a is positioned after the pointer field 71b, the packet constructor 55 sets the value of the pointer field to 0 and provides the packet header generator 53 with information about the presence of the pointer field 71b. Also, the packet constructor 55 inserts the start_byte (0xB8) 71c before the IP-based data packet 71a to indicate the start of the IP-based data packet 71a. When the length (byte count) of the IP-based data packet 71a is shorter than the payload of the media data transport packet, the payload is filled with the stuff_byte (0xff) 71d.

Further, the packet header generator 53 may generate a header 71e in which the value of the PUSI field is set to "1".

Figure 7B:
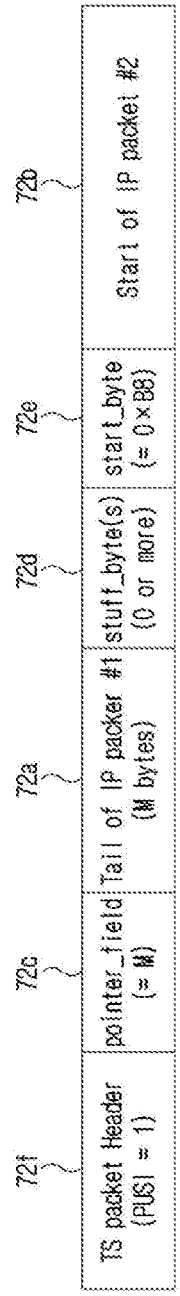

FIG. 7B shows the case in which after the last M bytes of the IP-based data packet 72a are positioned in the payload of the media data transport packet, the IP-based data packet 72b is positioned.

The packet constructor 55 sets the value of the pointer field 72c to "M" and provides the packet header generator 53 with information about the presence of the pointer field 72c. Also, the packet constructor 55 inserts the stuff_byte (0xff) 72d after the IP-based data packet 72a, and inserts the start_byte (0xB8) 72e before the IP-based data packet 72b to indicate the start of the IP-based data packet 72b.

Further, the packet header generator 53 may generate the header 72f in which the value of the PUSI field is set to "1".

Figure 7C:
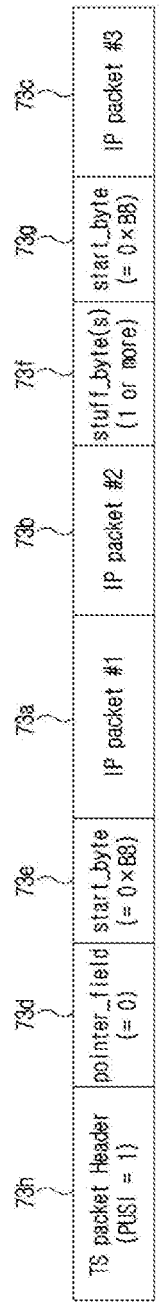

FIG. 7C shows the case in which multiple IP-based data packets 73a, 73b, and 73c are positioned in a single media data transport packet.

Since the start byte of the first IP-based data packet 73a is positioned immediately after the pointer field 73d, the packet constructor 55 may set the value of the pointer field 73d to "0". Also, the packet constructor 55 may provide the packet header generator 53 with information about the presence of the pointer field 73d, and in response thereto, the packet header generator 53 may generate the header 73h in which the value of the PUSI field is set to "1".

As shown in FIG. 7C, the packet constructor 55 may configure the second IP-based data packet 73b to be positioned immediately after the first IP-based data packet 73a, may configure the third IP-based data packet 73c to be positioned after the second IP-based data packet 73b with the stuff_byte (0xff) 73f inserted between the IP-based data packets, and may insert the start_byte (0xB8) 73g before the third IP-based data packet 73c.

Figure 7D:
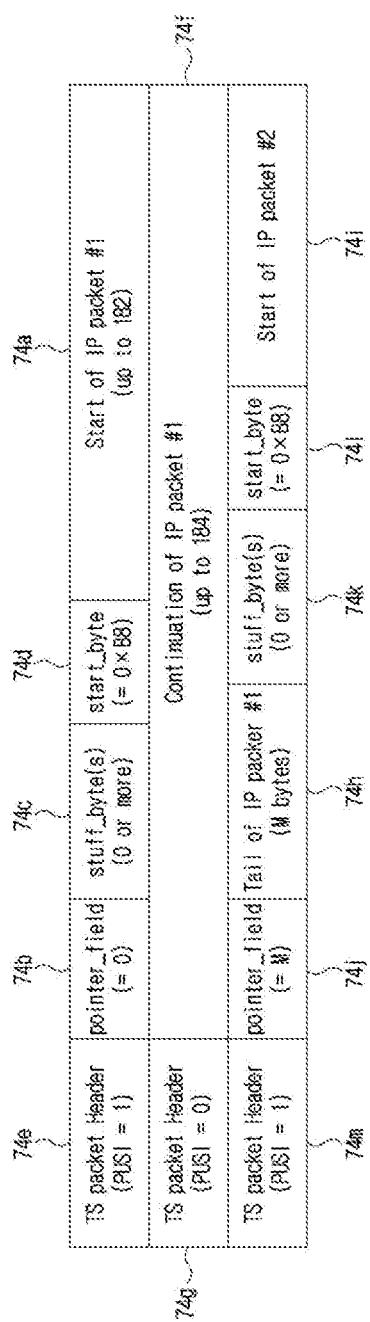

FIG. 7D shows the case in which the length of the IP-based data packet is much longer than the length of the media data transport packet, and thus the IP-based data packet is separated and allocated to multiple media data transport packets for transmission.

Since the beginning portion of the first IP-based data packet 74a is positioned in the first media data transport packet 74', the packet constructor 55 sets the value of the pointer field 74b to "0". Also, the packet constructor 55 may provide the packet header generator 53 with information about the presence of the pointer field 74b, and in response thereto, the packet header generator 53 may generate the header 74e in which the value of the PUSI field is set to "1".

Further, the packet constructor 55 may insert the stuff byte 74c before the IP-based data packet, and may insert the start byte 74d between the stuff byte 74c and the IP-based data packet.

Also, data 74f in the middle portion of the first IP-based data packet is positioned in the second media data transport packet 74". In this case, the packet constructor 55 may insert the data 74f in the middle portion of the first IP-based data packet over the entire payload section of the media data transport packet, and may provide the packet header generator 53 with absence of the pointer field 74b. In response thereto, the packet header generator 53 may generate the header 74g in which the value of the PUSI field is set to "0".

In the third media data transport packet 74''', data 74h is positioned at the last portion of the first IP-based data packet, and a new IP-based data packet 74i follows. In this case, the packet constructor 55 sets the value of the pointer field 74j to "N" in consideration of the length (for example, N, which is a natural number) of the data 74h in the last portion of the first IP-based data packet, and provides the packet header generator 53 with information about the presence of the pointer field 74j. Also, the packet constructor 55 inserts the stuff_byte (0xff) 74k at the rear end of the data 74h in the last portion of the IP-based data packet, and inserts the start_byte (0xB8) 74l before the IP-based data packet 74i to indicate the start of the IP-based data packet 72b.

Further, the packet header generator 53 may generate the header 74m in which the value of the PUSI field is set to "1".

Figure 8:
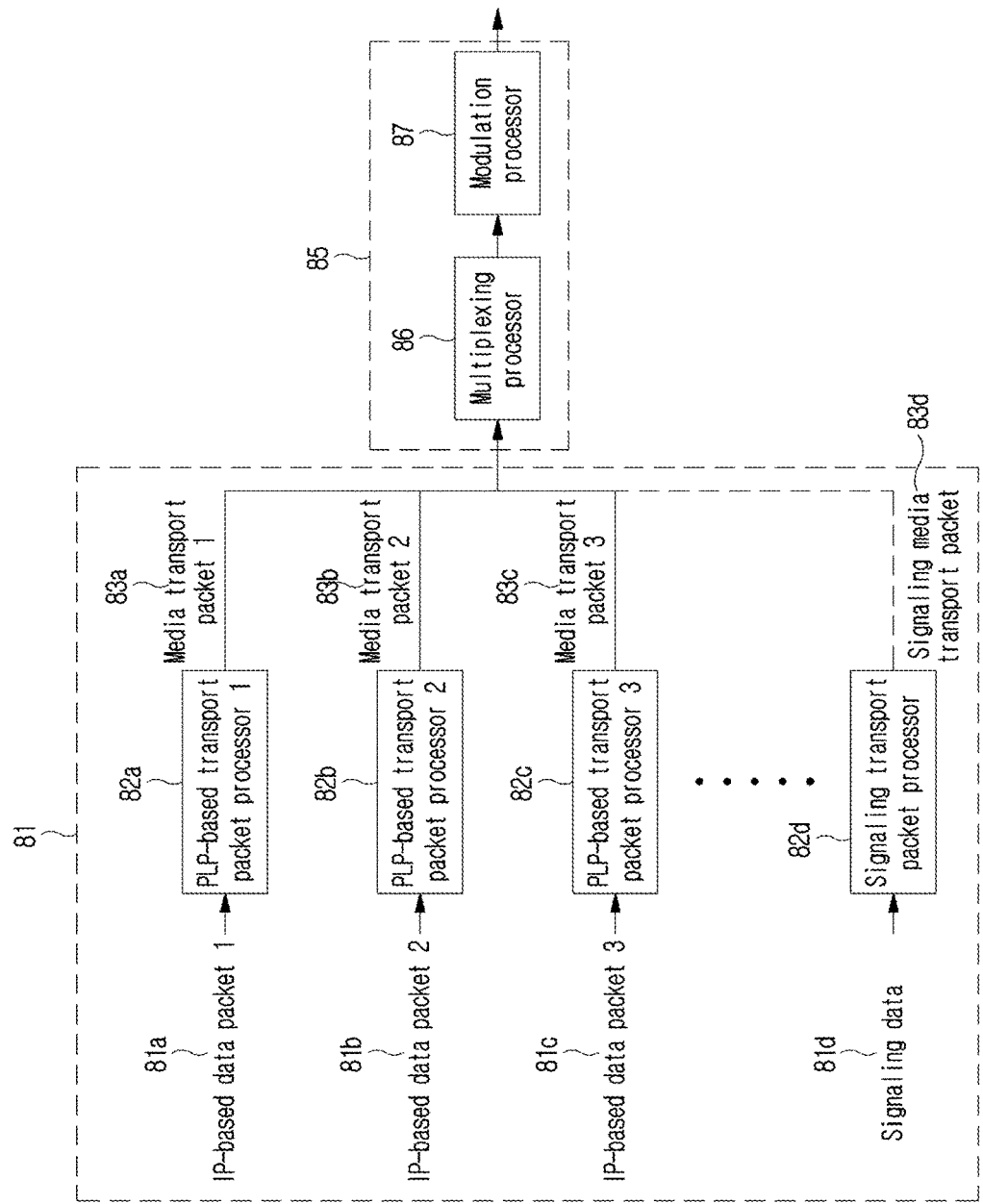
FIG. 8 is a diagram illustrating an example of a configuration of an apparatus for transmitting broadcasting data, which is provided in a cable TV broadcasting system according to various embodiments of the present disclosure.

FIG. 8 is a diagram illustrating an example of a configuration of an apparatus for transmitting broadcasting data, which is provided in a cable TV broadcasting system according to various embodiments of the present disclosure.

Referring to FIG. 8, an apparatus 80 for transmitting broadcasting data may include a media transport packet generation unit 81 and a broadcasting data transmission unit 85. The media transport packet generation unit 81 may process an operation performed at the cable TV broadcasting link layer 33, and the broadcasting data transmission unit 85 may process an operation performed at the cable TV broadcasting physical layer 31.

The media transport packet generation unit 81 includes: PLP-based transport packet processors 82a, 82b, and 82c receiving one or more IP-based data packets 81a, 81b, and 81c which are different from each other and are generated on the basis of the physical layer pipe (PLP) scheme, and generating one or more media transport packets 83a, 83b, and 83c that contain the one or more IP-based data packets 81a, 81b, 81c; and a signaling transport packet processor 82d generating a signaling media transport packet 83d that contains signaling data 81d for the one or more IP-based data packets 81a, 81b, and 81c.

Specifically, the one or more IP-based data packets 81a, 81b, and 81c and the signaling data 81d may be data generated by the IP-based broadcasting service layer 35 on the basis of the physical layer pipe (PLP) scheme.

The PLP-based transport packet processors 82a, 82b, and 82c receive different IP-based data packets 81a, 81b, and 81c generated on the basis of the PLP, respectively, and generate PLP-based media data transport packets individually. Here, the PLP-based transport packet processors 82a, 82b, and 82c allocate different values of PID fields of the media data transport packet headers for respective IP-based data packets 81a, 81b, and 81c for identification on a per-PLP basis.

The signaling transport packet processor 82d generates the signaling media transport packet 83d using CLP signaling data provided from the IP-based broadcasting service layer 35, for example, data included in a link mapping table (LMT), a ROHC-U description table (RDT), and the like defined in the ATSC 3.0 standards-based ATSC Link-layer Protocol (ALP). This may be applied equally to transmitting MPEG-2 section data defined in the MPEG-2 system standards, which is contained in the media data transport packet.

The value of the 6-bit PLP_ID field in the LMT and RDT is used to identify the PLP, and is required to be mapped with the values of the PID fields included in the headers of the media transport packets 83*a*, 83*b*, and 83*c*. To this end, when generating the media transport packets 83*a*, 83*b*, and 83*c*, the PLP-based transport packet processors 82*a*, 82*b*, and 82*c* may set the upper 7 bits in the PID field of 13 bits to "0000000", and may set the lower 6 bits to be the same value as the PLP_ID. Accordingly, it is possible to identify the PLP indicated by the LMT and RDT in the signaling media transport packet 83*d* provided from the signaling transport packet processor 82*d*.

Also, the PID of the signaling media transport packet 83*d* transmitting the LMT and the RDT uses a dedicated value (for example: LMT PID=0x1FFC, RDT PID=0xIFFD), and thus the signaling transport packet processor 82*d* enables easy acquisition at the receiving end. Also, the signaling transport packet processor 82*d* uses 1 bit of the 2-bit reserved field positioned after the PLP_ID field in the LMT as the IIs_flag field so as to indicate that Low Level Signaling (LLS) data is transmitted in the PLP indicated by the relevant PLP_ID.

Further, in order to provide time information, a system time table (STT) of a program and a system information protocol (PSIP), which are used in conventional cable TV broadcasting, are used to provide Universal Time Coordinated (UTC) time information to the receiving end.

In the meantime, the broadcasting data transmission unit 85 may include: a multiplexing processor 86 multiplexing the one or more media transport packets 83*a*, 83*b*, and 83*c* and the signaling media transport packet 83*d*; and a modulation processor 87 modulating and transmitting the media transport packet multiplexed by the multiplexing processor.

Accordingly, the cable TV broadcasting system and the apparatus for transmitting the broadcasting data according to the various embodiments of the present disclosure provide IP-based broadcasting data while the existing apparatus for cable TV broadcasting remains, and upgrade the cable TV broadcasting system to an IP-based next-generation broadcasting system in an economical manner.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

Figure 9:
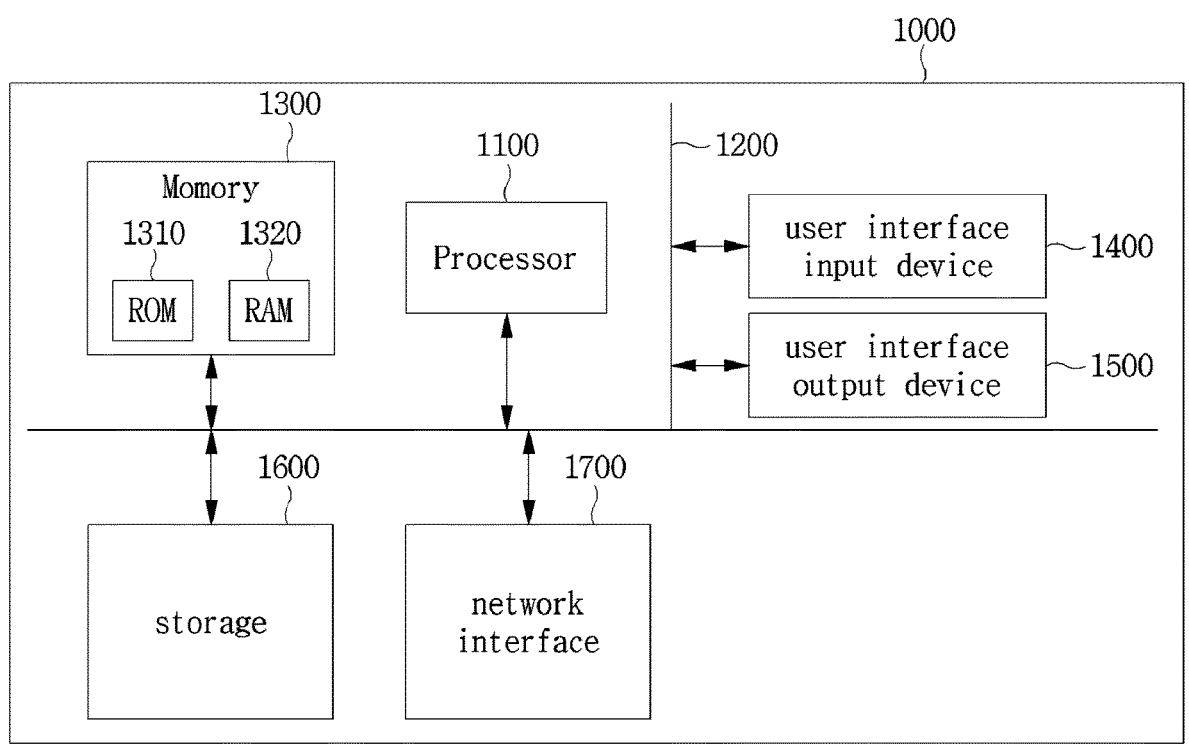
FIG. 9 is a block diagram illustrating an example of a computing system executing a method and apparatus for transmitting broadcasting data according to an embodiment of the present disclosure.

FIG. 9 is a block diagram illustrating an example of a computing system executing a method and apparatus for transmitting broadcasting data according to an embodiment of the present disclosure.

Referring to FIG. 9, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or non-volatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A method of transmitting broadcasting data, the method comprising:
    determining at least one IP-based data packet provided in different lengths and received from a higher layer;
    generating a media transport packet having a fixed length by converting the at least one IP-based data packet; and
    generating broadcasting data by modulating the generated media transport packet on the basis of a broadcasting data modulation scheme and transmitting the broadcasting data,
    wherein the media transport packet includes a media transport packet payload containing data of the at least one IP-based data packet, and
    wherein the media transport packet payload includes:
    a start indication field indicating a start of the at least one IP-based data packet;
    a data field containing data of the at least one IP-based data packet; and
    an end indication field indicating an end of the at least one IP-based data packet,
    wherein the generating of the media transport packet comprises:

generating at least one media transport packet corresponding to the at least one IP-based data packet different from each other on the basis of a physical layer pipe (PLP) scheme; and generating a signaling media transport packet including signaling data for the at least one IP-based data packet.

2. The method of claim 1, wherein the media transport packet includes:
a media transport packet header containing an identifier indicating whether at least one new IP-based data packet is present in the media transport packet payload.

3. The method of claim 2, wherein the media transport packet includes a pointer field containing pointer information that indicates a position of the media transport packet payload.

4. The method of claim 2, wherein the media transport packet header includes:
a sync byte information field containing information that indicates sync data of the media transport packet;
a PID information field containing a packet identifier (PID) that indicates the IP-based data packet; and
a cyclic counter field containing information that indicates the number of the media transport packets having the same packet identifier (PID).

5. The method of claim 1, wherein the broadcasting data modulation scheme includes a modulation scheme of cable TV broadcasting data.

6. The method of claim 5, wherein a modulation scheme of cable TV broadcasting data is a 64-QAM or 256-QAM scheme.

7. The method of claim 1, wherein the media transport packet is an MPEG-2 TS-based packet.

8. The method of claim 1, wherein the generating and transmitting of the broadcasting data comprises:
generating a multiplexed media transport packet by multiplexing the at least one media transport packet and the signaling media transport packet; and
modulating the multiplexed media transport packet for transmission.

9. An apparatus for transmitting broadcasting data, the apparatus comprising:
a media transport packet generation unit comprising packet processors configured to receive at least one IP-based data packet provided in different lengths from a higher layer and generate a media transport packet having a fixed length by converting the at least one IP-based data packet; and
a broadcasting data transmission unit comprising processors configured to generate broadcasting data by modulating the generated media transport packet on the basis of a broadcasting data modulation scheme and transmit the generated broadcasting data,
wherein the media transport packet generation unit comprising packet processors generates the media transport packet including a media transport packet payload containing data of the one or more IP-based data packets, and wherein the media transport packet payload includes:
a start indication field indicating a start of the at least one IP-based data packet;
a data field containing data of the at least one IP-based data packet; and
an end indication field indicating an end of the at least one IP-based data packet,
wherein the media transport packet generation unit comprising packet processors comprises:
a PLP-based transport packet processor configured to generate at least one media transport packet corresponding to the at least one IP-based data packet, which are different from each other, on the basis of a physical layer pipe (PLP) scheme; and
a signaling transport packet processor configured to generate a signaling media transport packet including signaling data for the at least one IP-based data packet.

10. The apparatus of claim 9, wherein the media transport packet generation unit comprising packet processors generates the media transport packet including:
a media transport packet header containing an identifier that indicates whether at least one new IP-based data packet is present in the media transport packet payload.

11. The apparatus of claim 10, wherein the media transport packet generation unit comprising packet processors generates the media transport packet including a pointer field that contains pointer information which indicates a position of the media transport packet payload.

12. The apparatus of claim 10, wherein the media transport packet generation unit comprising packet processors generates the media transport packet header including:
a sync byte information field containing information that indicates sync data of the media transport packet;
a PID information field containing a packet identifier (PID) that indicates the IP-based data packet; and
a cyclic counter field containing information that indicates the number of the media transport packets having the same packet identifier (PID).

13. The apparatus of claim 9, wherein the broadcasting data transmission unit comprising processors modulates the generated media transport packet on the basis of a modulation scheme of cable TV broadcasting data.

14. The apparatus of claim 13, wherein the modulation scheme of the cable TV broadcasting data is a 64-QAM or 256-QAM scheme.

15. The apparatus of claim 9, wherein the media transport packet generation unit comprising packet processors generates the media transport packet on the basis of an MPEG-2 TS.

16. The apparatus of claim 9, wherein the broadcasting data transmission unit comprising processors comprises:
a multiplexing processor configured to multiplex the at least one media transport packets and the signaling media transport packet to produce a multiplexed media transport packet; and
a modulation processor configured to modulate the multiplexed media transport packet obtained by the multiplexing processor for transmission.

* * * * *